UNITED STATES PATENT OFFICE.

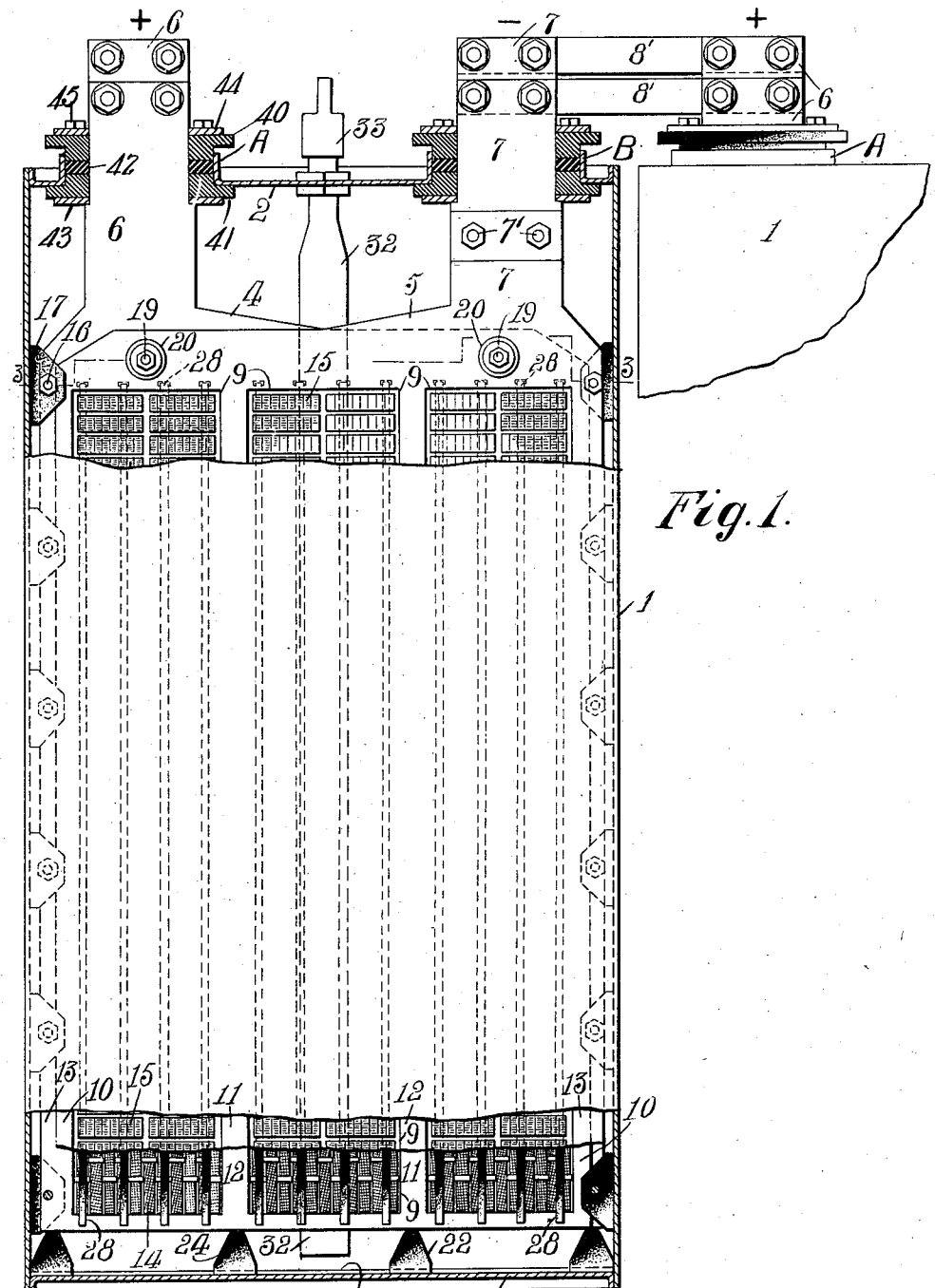

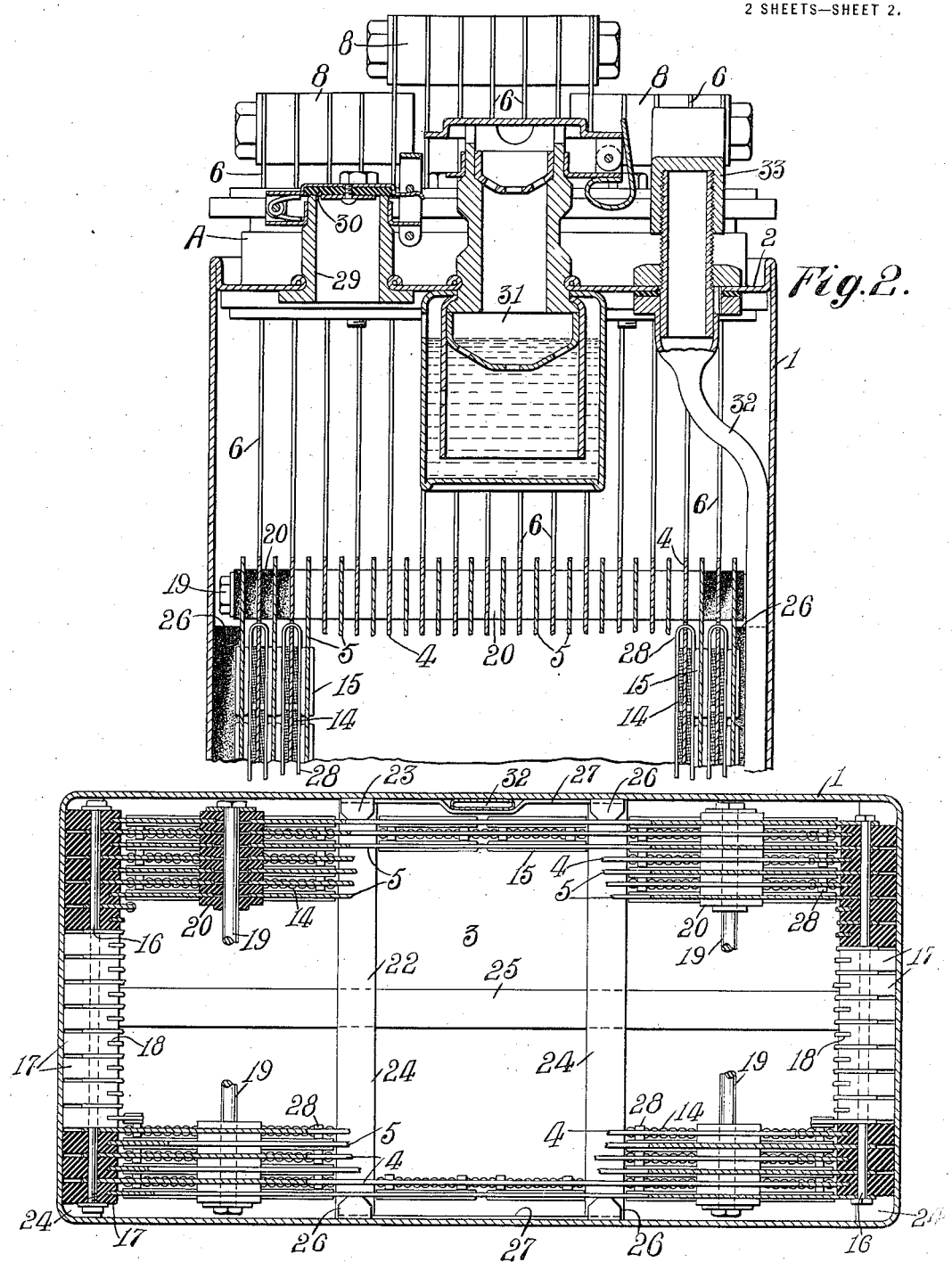

MILLER REESE HUTCHISON AND CHARLES W. NORTON, OF WEST ORANGE, NEW JERSEY, ASSIGNORS TO EDISON STORAGE BATTERY COMPANY, OF WEST ORANGE, NEW JERSEY, A CORPORATION OF NEW JERSEY.

STORAGE BATTERY.

1,165,101.

Specification of Letters Patent. Patented Dec. 21, 1915.

Application filed August 13, 1914. Serial No. 856,516.

*To all whom it may concern:*

Be it known that we, MILLER REESE HUTCHISON, a citizen of the United States, and a resident of Llewellyn Park, West Orange, Essex county, New Jersey, and CHARLES W. NORTON, a citizen of the United States, and a resident of West Orange, Essex county, New Jersey, have invented certain new and useful Improvements in Storage Batteries, of which the following is a description.

Our invention relates to improvements in secondary or storage batteries, being in some aspects an improvement on the invention disclosed in our pending application, Serial No. 840,462, filed May 23, 1914, and entitled storage batteries; and while particularly directed to storage batteries of the Edison type, wherein insoluble active materials are employed in an alkaline electrolyte, it is to be understood that the present improvements are applicable to storage batteries of other types.

The principal objects of our invention reside in an improved arrangement and construction of a storage battery cell whereby the resistance of the cell will be reduced and the efficiency thereof increased, and in the provision of improved means for rigidly securing the positive and negative plates together whereby they are maintained properly spaced and insulated from each other and from the walls of the battery can or container, and whereby relative movement of the plates and parts coöperating therewith will be effectively prevented when the assembled battery structure is removed from the container.

Our invention also contemplates the provision of improved means for separating and insulating adjacent plates of opposite polarity in a cell from each other.

Other objects and features of our invention reside in the details of construction and combinations of elements hereinafter more fully described and claimed.

For a clearer understanding of our invention, attention is directed to the accompanying drawings forming part of this specification, and in which—

Figure 1 is a view in front elevation, partly broken away, of a storage battery cell constructed in accordance with our invention, and showing the same connected to a cell of similar construction; Fig. 2 is an enlarged transverse vertical sectional view, partly in elevation and partly broken away, of the cell shown in Fig. 1 and showing a safety device or trap applied thereto for controlling the escape of gases therefrom and the admission of air thereto; Fig. 3 is an enlarged sectional view, partly broken away and with parts shown in full, taken approximately on line 3—3 of Fig. 1.

In all the views of the drawing, corresponding parts are designated by the same reference characters.

Referring to the drawing, reference character 1 represents the can or container of our improved storage battery cell, which container is substantially rectangular in form and preferably has the top 2 and bottom 3 welded to the side walls thereof, as is customary in storage batteries of the Edison type.

Within the container 1 is disposed a bank or group of positive and negative plates or elements 4 and 5. These positive and negative plates are preferably alternately arranged side by side and extend transversely of the container, and the number of negative plates preferably exceeds the number of positive plates by one, whereby both of the outside plates adjacent the front and rear walls of the container will be of negative polarity. The positive plates 4 are each provided adjacent one side with a pole or terminal connection preferably in the form of an integral vertical projection 6, and the negative plates 5 are each provided adjacent the opposite sides with a pole or terminal connection preferably in the form of an integral vertical projection 7. The projections 7 of the two outside negative plates terminate inside the container and are each deflected inwardly and electrically connected as shown at 7' in Fig. 1 with the projection 7 of the adjacent negative plate. The rest of the projections 7 and all of the projections 6 respectively extend through stuffing boxes B and A secured in the top 2 of the container. Each of the stuffing boxes A, B is secured to the container top 2 in a suitable opening therefor and preferably comprises a pair of flanged hard rubber members or bushings 40 and 41 and a suitable resilient packing member 42, preferably of soft rubber, interposed between members 40 and 41. A pair of metallic plates 43 and 44 are respectively disposed beneath the lower part of bushing 41 and above the upper member or bushing 40 of each stuffing box, and bolts 45 are passed through members 40, 41, 42, 43 and 44, the heads of the bolts bearing on the upper plate 44 and the lower ends thereof being threaded into the lower plate 43. Members 40, 41, 42, 43 and 44 are provided with registering openings or slots through which the projections 6 or 7 extend. By tightening the bolts 45, members 40 and 41 will be forced toward each other and the soft rubber member 42 will thereby be compressed and expanded laterally to form fluid tight joints with the projections 6 and 7. Above the stuffing boxes A and B the projections 6 and 7 are rigidly secured together as by bolts, being maintained in spaced relation by blocks 8. As shown in Fig. 1, the projections 7 of the negative plates 5 may be mechanically and electrically connected, as by bars 8', to the projections 6 of the positive plates of another cell. The construction described above is similar to that disclosed and claimed in an application of Charles W. Norton, Serial No. 856,527, filed August 13, 1914, and entitled secondary or storage batteries, to which application reference is hereby made for a more detailed description.

Each of the positive and negative plates 4 and 5 comprises a substantially rectangular grid provided with a plurality of vertical rows of equal sized openings 9, whereby the grid is formed with vertical strips or "risers" 10, 11, 12 and 13 adjacent the rows of openings. In the openings 9 of each grid are suitably secured the positive or negative tubes or pockets, the positive tubes 14 preferably being vertically disposed and the negative pockets 15 preferably being horizontally disposed. In order to increase the conductivity or current-carrying capacity of each grid toward the pole side thereof, the strips 11 and 12 are wider than strip 10 and strip 13 is wider than strips 11 and 12. The risers 11 and 12 are preferably of equal width whereby in assembling the cell the vertical rows of openings in any grid may be and are respectively registered with the vertical rows of openings in the adjacent grids, to thereby obtain the most effective relative positioning of the positive and negative tubes or pockets carried by the respective grids. Owing to the difference in width of "risers" 10 and 13, the positive plates will project beyond the negative plates at one side of the cell and the negative plates will project beyond the positive plates at the other side of the cell, as clearly shown in Fig. 3. At each side of the cell the projecting portions of the plates of one polarity are rigidly secured together and maintained in predetermined spaced relation to each other and to the adjacent portions of the plates of opposite polarity by means of metallic bolts or rods 16 and insulating blocks 17 of hard rubber mounted on the rods. The rods 16 at each side of the cell pass through the projecting portions of the plates of one polarity and serve to electrically connect the same. The hard rubber blocks 17 mounted on the rods 16 are provided with recesses 18 in which the adjacent edge portions of the plates of opposite polarity fit closely and are thereby held in fixed spaced relation with each other and with such projecting portions. The hard rubber blocks 17 also serve to insulate the positive and negative plates from the adjacent side walls of the container 1. All the plates are rigidly secured together and spaced and insulated from each other at their upper end portions, preferably by means of bolts 19 extending through all the plates and hard rubber washers or sleeves 20 mounted on these bolts.

The plates are supported at their lower edges and insulated from the bottom of the can or container 1 by a suitable frame or "stool" 22, and are insulated and spaced from the front and rear walls of the container by suitable frames 23. The supporting frame or "stool" 22 preferably comprises a plurality of parallel hard rubber bars 24, which extend transversely of the plates 4 and 5 and are suitably held together in spaced relation by a plurality of parallel steel strips 25 disposed at right angles to the bars 24 and suitably secured thereto. Each of the frames 23 preferably consists of a plurality of parallel vertical hard rubber members 26, secured together in spaced relation by a plurality of parallel horizontal steel strips 27.

The positive tubes 14 and negative pockets 15 of adjacent plates 4 and 5 are insulated and separated from each other by means of inverted U-shaped hard rubber strips 28 which pass loosely through and are supported by the plates 4 above the tubes 14. The legs of each of these U-shaped strips 28 are respectively disposed on opposite sides of the pockets 14 of the plate 4 through which the strip extends. Owing to the horizontal disposition of the negative pockets 15, but comparatively few of these strips 28 are necessary in order to maintain proper insulation between the adjacent positive and negative plates.

It will be apparent that, by reason of the manner in which the positive and negative plates are connected at their edge portions and at their upper ends and by reason of the form of the strips 28 for insulating the adjacent positive and negative plates from each other and the manner in which these strips are supported, the entire assembled battery structure may be removed bodily from the container without any relative movement of the battery plates or elements taking place and without any liability of destroying or losing the insulation between adjacent plates.

Reference character 29 represents the usual filling neck or tube, suitably secured in the top 2 of the container, which is normally maintained closed by a cap or cover 30.

Reference character 31 indicates generally a safety device or trap which is suitably secured to the top 2 of the container and is adapted to control the escape of gases from, and the admission of air to the interior of the cell. This safety device or trap is preferably similar in construction to that disclosed and claimed in an appplication of Miller Reese Hutchison, Serial No. 827,784, filed March 28, 1914 and entitled safety devices.

The cell is preferably provided with a tubular member or drain-tube 32 extending through and secured to the top 2 of the container and having its upper end normally closed by a cap 33. The drain tube 32 extends nearly to the bottom of the container 1 and for the greater portion of its length is disposed close against the rear wall of the container. The frame 23 between the rear wall of the container and the adjacent negative plate 5 has its horizontal connecting strips 27 bent inwardly around the tube 32, as shown in Fig. 3. On removing cap 33 the electrolyte may be readily removed from the cell, without tipping or inverting the latter, either by applying pressure to the surface of the electrolyte through the safety device 31 or by applying suction to the upper end of the tubular member 32. The construction just described for removing the electrolyte is similar to that disclosed and claimed in an application of Miller Reese Hutchison, Serial No. 834,293, filed May 25, 1914, entitled storage batteries.

It is to be understood that many changes in the shape, size, and arrangement of parts of the construction shown and described herein may be made without any departure from the spirit of our invention and the scope of the appended claims.

Having now described our invention what we claim as new and desire to protect by Letters Patent of the United States is as follows:

1. In a storage battery cell, a plurality of plates arranged side by side each provided with pockets containing active material, the pockets of each pair of adjacent plates being respectively vertically and horizontally disposed, and means for separating the plates from each other comprising one or more U-shaped insulating strips extending through each plate provided with the vertically disposed pockets, the legs of each such strip being respectively vertically disposed on opposite sides of the plate through which it extends, substantially as described.

2. In a storage battery cell, a plurality of alternately arranged negative and positive plates, said negative plates having horizontally disposed pockets containing active material and said positive plates having vertically disposed pockets containing active material, and means for insulating the plates from each other comprising one or more U-shaped strips extending through each of the positive plates and having their legs respectively vertically disposed on opposite sides of such positive plates, substantially as described.

3. In a storage battery cell, a container, a plurality of negative and positive plates arranged side by side in said container, the positive plates projecting beyond the negative plates at one side of the cell and the negative plates projecting beyond the positive plates at the opposite side of the cell, and means at each side of the cell for rigidly connecting together the corresponding projecting portions of the plates of one polarity and for insulating therefrom and maintaining in predetermined spaced relation thereto the adjacent edge portions of the plates of opposite polarity, said means also serving to prevent said plates from contacting the adjacent walls of the container, substantially as described.

4. In a storage battery cell, a plurality of negative and positive plates arranged side by side, the positive plates projecting beyond the negative plates at one side of the cell and the negative plates projecting beyond the positive plates at the opposite side of the cell, and means at each side of the cell for rigidly and electrically connecting together the corresponding projecting portions of the plates of one polarity, said means comprising devices for directly engaging the adjacent edge portions of the plates of opposite polarity, and serving to insulate the latter from and maintain the same in predetermined spaced relation to the other plates, substantially as described.

5. In a storage battery cell, a plurality of negative and positive plates arranged side by side, the positive plates projecting beyond the negative plates at one side of the cell and the negative plates projecting beyond the positive plates at the opposite side of the cell, and means at each side of the cell for rigidly connecting together the corresponding projecting portions of the plates of one polarity and for insulating therefrom and maintaining in predetermined spaced relation thereto the adjacent edge portions of the plates of opposite polarity, said means comprising one or more rods passing through said projecting portions and members of insulating material mounted on said rods and engaging the adjacent edge portions of the plates of opposite polarity to positively hold the latter at the edge portions thereof in predetermined spaced relation to said projecting portions, substantially as described.

6. In a storage battery cell a plurality of negative and positive plates arranged side by side, the positive plates projecting beyond the negative plates at one side of the cell and the negative plates projecting beyond the positive plates at the opposite side of the cell, means at each side of the cell for rigidly connecting together the corresponding projecting portions of the plates of one polarity and for insulating therefrom and maintaining in predetermined spaced relation thereto the adjacent edge portions of the plates of opposite polarity, and means for rigidly connecting together and insulating from each other all of said plates adjacent their upper ends, substantially as described.

7. In a storage battery cell a plurality of negative and positive plates arranged side by side, the positive plates projecting beyond the negative plates at one side of the cell and the negative plates projecting beyond the positive plates at the opposite side of the cell, means at each side of the cell for rigidly connecting together the corresponding projecting portions of the plates of one polarity and for insulating therefrom and maintaining in predetermined spaced relation thereto the adjacent edge portions of the plates of opposite polarity, and means for rigidly connecting together all of said plates at their upper ends, said last means comprising one or more rods extending through all the plates and members mounted on said rods for insulating the rods from the plates and the plates from each other, substantially as described.

8. In a storage battery cell, a plurality of alternately arranged negative and positive plates respectively having pole or terminal connections at opposite sides of the cell, each of said plates being provided with a plurality of rows of equal sized openings for the reception of pockets containing active material whereby the plate is formed adjacent said rows with strips or risers, one at each of its sides and a plurality intermediate said sides, the intermediate strips being of equal width, the strip at the terminal side being wider than the intermediate strips and the strip at the opposite side being narrower than the intermediate strips, said plates being positioned with the openings thereof respectively registering, substantially as described.

9. In a storage battery cell, a plurality of plates arranged side by side and provided with pockets containing active material, the pockets of each pair of adjacent plates being respectively vertically and horizontally disposed, and means for separating the plates from each other comprising one or more insulating strips vertically disposed between each pair of adjacent plates, substantially as described.

This specification signed by said MILLER REESE HUTCHISON and witnessed on his behalf the 10th day of August, 1914, and signed by said CHARLES W. NORTON and witnessed on his behalf the 12th day of August, 1914.

MILLER REESE HUTCHISON.
CHARLES W. NORTON.

Witnesses to signature of Miller Reese Hutchison:
  W. P. HUTCHISON,
  M. P. HUTCHISON.

Witnesses to signature of Charles W. Norton:
  WILLIAM A. HARDY,
  MARY J. LAIDLAW.